United States Patent [19]

Chung

[11] Patent Number: 5,075,929
[45] Date of Patent: Dec. 31, 1991

[54] HINGE MECHANISM FOR A PORTABLE APPARATUS

[75] Inventor: Shao-Wei Chung, Hsin-Chu, Taiwan

[73] Assignee: Industrial Technology Research Institute, Taiwan

[21] Appl. No.: 547,754

[22] Filed: Jul. 2, 1990

[51] Int. Cl.⁵ .................. E05C 17/64; E05D 11/08
[52] U.S. Cl. ................................. 16/342; 16/337
[58] Field of Search ......... 16/337, 341, 342, DIG. 43, 16/253

[56] References Cited

U.S. PATENT DOCUMENTS 4,620,344 11/1986 Lewis, Jr. ............................ 16/337
4,730,364 3/1988 Tat-Kee ............................... 16/341

Primary Examiner—Robert L. Spruill
Assistant Examiner—Carmine Cuda
Attorney, Agent, or Firm—Darby & Darby

[57] ABSTRACT

A hinge mechanism for a portable apparatus having a keyboard base and a display unit pivotable between open and closed positions. The hinge mechanism comprises a rod disposed within a bearing and connected to a bracket mounted on the base. A spring is disposed over the base to provide a compression force against the bearing in the axial direction of the rod to provide frictional engagement between the rod and bearing to hold the display in the open position. The outer wall of the rod is tapered to cooperate with the tapered inner wall of the bearing.

14 Claims, 4 Drawing Sheets

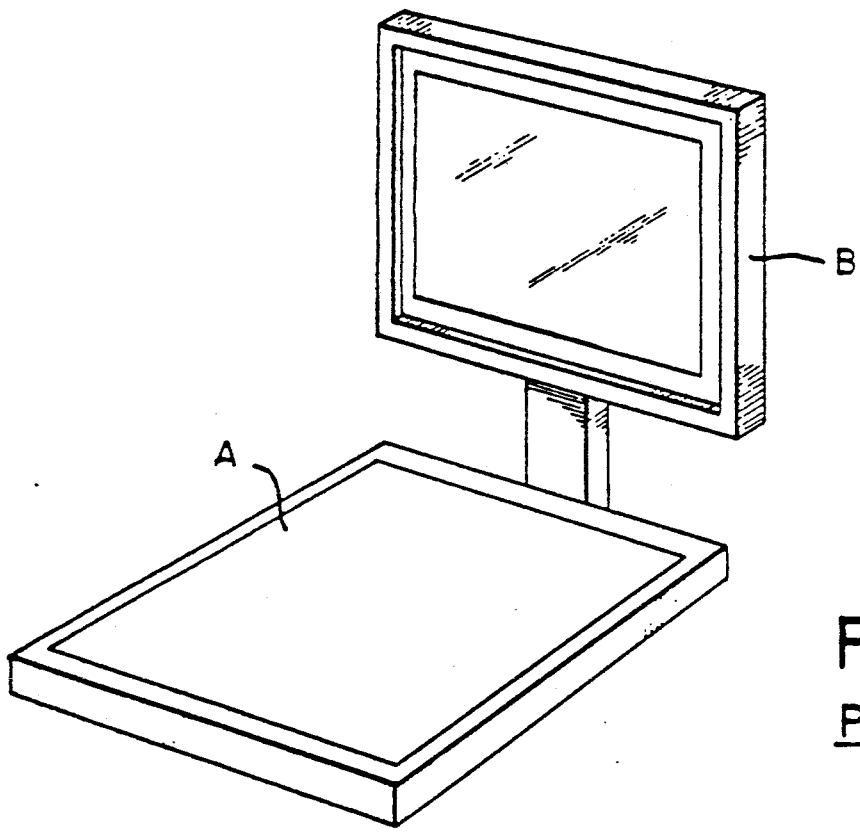
FIG. IA
PRIOR ART
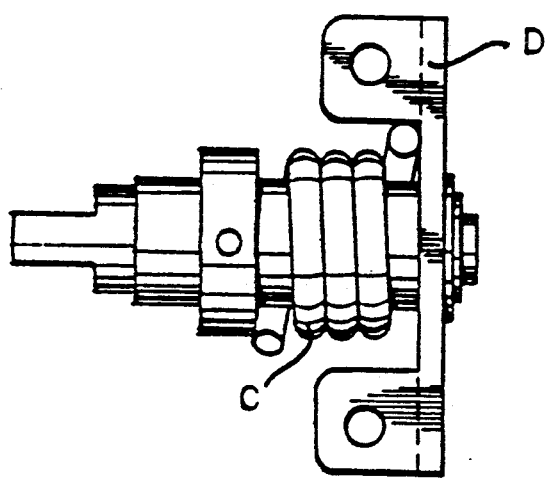
FIG. IB
PRIOR ART

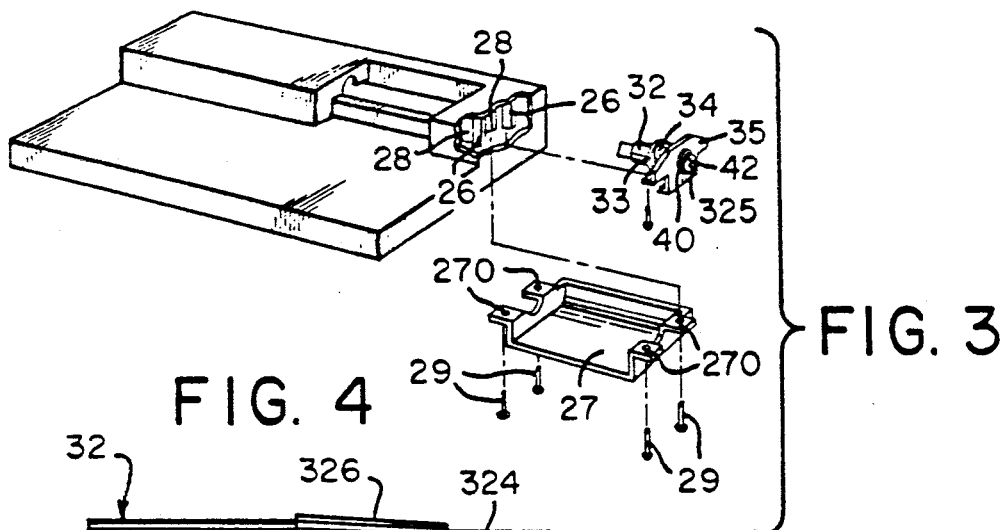

HINGE MECHANISM FOR A PORTABLE APPARATUS

BACKGROUND OF THE INVENTION

1. Field of the Invention

This invention relates to a hinge mechanism for a portable apparatus such as a computer or word processor, and more particularly to a hinge mechanism for coupling a foldable flat panel display to a keyboard base of the apparatus.

2. Description of the Related Art

Apparatus such as personal computers and word processors have been recently miniaturized to a portable size which can be conveniently hand-held. These miniaturized apparatus provide the advantage of convenient transport and reduced storage space. They comprise a flat-panel display unit, such as a liquid crystal display or a plasma display, hinged to a keyboard base so that the display unit can be pivoted between an open (angled) position for use and a closed (folded) position for transport or storage. In the open position, the display unit is disposed at an angle of up to 135 degrees to the keyboard base and in the closed position the display unit overlies the keyboard base so it can be carried like an attache case.

Since these apparatus are designed for portability, the display unit is constantly being opened and closed. Therefore, the significance of the mechanism hingedly connecting the display to the keyboard base cannot be understated.

The hinge mechanisms of the prior art comprise a spring which directly generates a contraction force resulting from the spring winding to maintain the display unit in its upright position. The spring is disposed longitudinally to the base and generates a force in this direction. The force exerted by the spring provides the clamping force for maintaining the display in its desired angled position for use.

A significant drawback of these prior hinge mechanisms is that the repeated opening and closing of the display unit weakens the spring, thereby resulting in the display unit abruptly falling onto the keyboard under force of its own weight and causing damage to the apparatus. Moreover, repeated opening and closing of the display eventually results in wearing out the spring so that it no longer effectively functions to support the display unit in its open position. Clearly, these drawbacks are critical since the objective of the portable apparatus is to allow for repeated opening and closing of the display unit to facilitate transport. Accordingly, these drawbacks cannot be avoided by limiting the frequency which the display is opened since this would defeat the objective of providing a compact, portable apparatus.

Attempts have been made to overcome the problems described above, but these attempts have been unsuccessful. One approach to prevent the display unit from undesirably falling onto the keyboard under the gravitational force of its own weight is to increase the rigidity and the strength of the spring mechanism. However, increasing the strength of the spring disadvantageously results in a corresponding increase in the difficulty in opening and closing the display unit. This problem is compounded since the larger the angle of the display with respect to the base (i.e. the greater the opening), the greater the force required by the user to open and close the display unit. This is a major disadvantage to users. Consequently, attempts to overcome the problems of worn springs by providing a stronger spring mechanism is not feasible since it runs counter to the objective of providing convenient opening and closing of the display.

The need therefore exists for a hinge mechanism of sufficient strength which enables the easy opening and closing of the display unit and does not wear out from frequent use.

SUMMARY OF THE INVENTION

The present invention overcomes the problems and deficiencies of the prior art by providing a hinge mechanism for a portable apparatus which allows for smooth opening and closing of the display, avoids damage to the apparatus by preventing the display from abruptly falling onto the keyboard base, and is fatigue free in the spring-winding direction so the spring does not wear out over time. The hinge mechanism of the present invention has means for pivotally securing the display to the base comprising spring means providing a horizontal compression force against the securing means (in a direction perpendicular to the movement of the display and transverse to the base) to create a frictional force between the display and base. The spring force thereby provides both the securing means for the display and base and the pivot means for the display. The spring means preferably provides a substantially constant force in both the open and closed positions of the display.

In a preferred embodiment, the securing means comprises a rod mounted to the base and a bearing receiving an end portion of the rod. A spring is disposed over the bearing and provides a compression force against the bearing in the direction towards the rod to provide frictional engagement between the rod and bearing.

BRIEF DESCRIPTION OF THE DRAWINGS

Various objects, features, and attendant advantages of the present invention will be more fully appreciated as the same become better understood from the following detailed description of the preferred embodiments of the present invention when considered with the accompanying drawings, in which:

FIG. 1A is a perspective view of the display unit and keyboard base of the prior art;

FIG. 1B is a top view of the hinge mechanism of the prior art;

FIG. 3 is an exploded view showing the keyboard base and the hinge mechanism in an assembled condition;

FIG. 4 is an enlarged top view of the rod of the hinge mechanism of the present invention;

FIG. 5 is an enlarged top view of the bearing of the hinge mechanism of the present invention;

FIG. 6 is an enlarged top view showing the rod of FIG. 5 partially inserted into the bearing of FIG. 6;

FIG. 7 is an enlarged front view of the rod mounting bracket of the present invention; and FIG. 8 is a top view of the mounting bracket of FIG. 7.

DETAILED DESCRIPTION OF THE PREFERRED EMBODIMENT

Figure 2A:
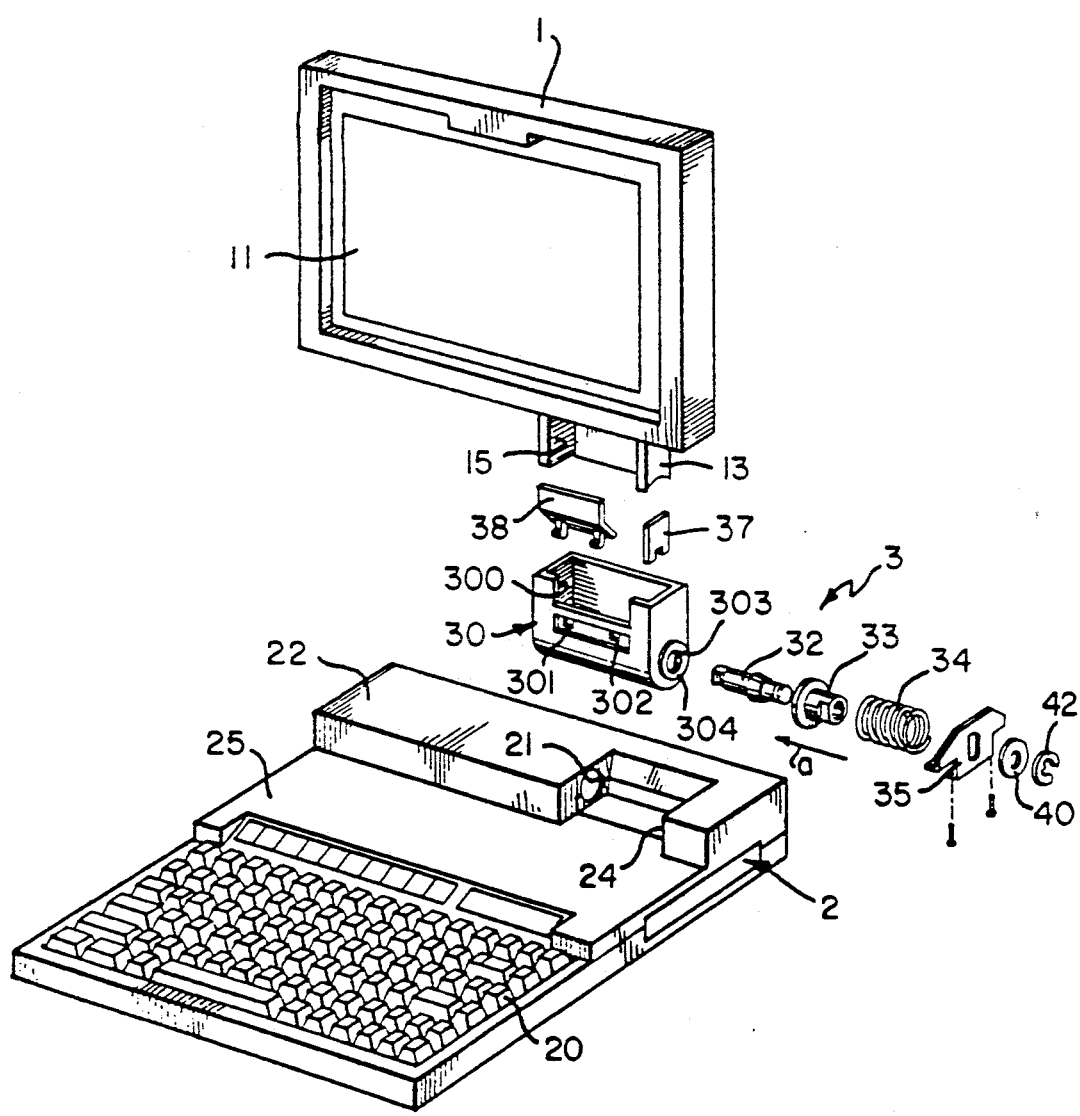
FIG. 2A is an exploded view showing the display unit, keyboard base and hinge mechanism of the present invention.

Referring now to the drawings, wherein like reference numerals represent identical or corresponding parts throughout the several views, FIGS. 1A and 1B illustrate a hinge mechanism of the prior art and FIGS. 2-8 illustrate the hinge mechanism of the present invention.

Referring first to the prior art depicted in FIGS. 1A and 1B, display unit B is pivotally mounted to keyboard base A by a hinge mechanism comprising a spring C and a bracket D. The spring C generates a contraction force resulted from the spring winding (arrow e) to maintain display unit B in an open position, i.e. at an angle to base A. The larger the angle between the display unit B and base A, the stronger the clamping force and thus the larger the force required by the user to open the display. Since the force is generated by the spring winding contraction, repeated opening and closing of display unit B disadvantageously weakens and eventually wears out the spring so that it ultimately fails to support the display in its upright (open) position.

Referring now to the present invention, and more particularly to FIG. 2A, display unit 1 is pivotally mounted to keyboard base 2 by a hinge mechanism 3. The display unit 1 can be of any type, such as a liquid crystal display or a plasma display, and comprises a conventional screen 11 for viewing by the user. Display unit 1 is secured to a keyboard base 2 to rotate from a closed position parallel to the keyboard base 2 to an open position angled to the base 2. In the closed position, display 1 overlies an upper surface 25 of base 2 and resembles an attache case. The display unit 1 includes a vertical member 13, having a channel 15 formed therein, which extends downwardly from its bottom wall.

Keyboard base 2 comprises a conventional keyboard 20 and has a transversely extending raised wall 22 at its remote end. The region forward of raised wall 22 provides a space dimensioned to substantially correspond to the length and width of display unit 1 in order to receive the display unit when it is folded onto base 2 to its closed position. A recess 24 is formed within raised wall 22 and includes two lip receiving holes 21. A pair of hollow vertical rods 28, as shown in FIG. 3, are spaced apart and extend downwardly from the inner surface of the upper wall of raised wall 22 on the right side. Another pair of spaced apart vertical rods (not shown), substantially identical in structure to vertical rods 28, extend from the left side of the upper wall of raised wall 22. Plate 27 comprises two pairs of screw holes 270 which receive screws 29 to connect plate 27 to the right vertical rods 28 and left vertical rods of base 2. Base 2 further includes a pair of vertical rods 26 spaced from vertical rods 28.

Hinge mechanism 3 provides for both rotation and securement of the display 1 to keyboard base 2 and in general comprises a hinge case 30, a rod 32, a bearing 33, a spring 34 and a mounting bracket 35, each of which is discussed in detail below.

Hinge case 30 of hinge mechanism 3 has an open end 300, a pair of holes 301 and 302, and a rod receiving hole 303 with a lip 304 disposed on opposing side walls. Hinge case 30 is received within recess 24 of keyboard base 2 so that rod receiving hole 303 is in axial alignment with lip receiving hole 21.

Rod 32, as shown in FIG. 2A and in the enlarged view of FIG. 4, extends transversely to the base 20 and preferably comprises a substantially flat end 321, a central portion 320 and a tapered portion 322. Portion 322 is tapered so that its outer wall 326 angles inwardly towards its longitudinal axis L in a direction away from central portion 320. The end of rod 32 opposite flat end 321 has an annular groove 323 separating a narrow portion 324 from tip 325. Narrow portion 324 and tip 325 are preferably cylindrically shaped and have an outer diameter less than the outer diameter of tapered wall 326.

Tubular bearing 33, as shown in FIG. 2A and the enlarged view of FIG. 5, has an outer wall 331 and a tapered inner wall 333. A annular lip 337 is provided at a rod receiving end 336 opposite the neck portion 335, and the tapered inner wall 333 angles inwardly towards the longitudinal axis M of bearing 33 from lip 337 to neck portion 335. As illustrated in FIGS. 2A, 5, 6, the bearing 33 is generally circular in cross section and includes opposed flat surfaces at the neck 335.

The rod 332 is received within bearing 33 as shown in FIG. 6 so their respective longitudinally axes L, M are substantially aligned. When fully inserted, tapered outer wall 326 of rod 32 is frictionally engaged by tapered inner wall 333 of bearing 33 as the progressively decreasing outer diameter of outer wall 326 corresponds to the progressively decreasing internal diameter of tapered wall 333. Rod 32 is inserted through bearing 33 so that groove 323 and tip 325, which have an outer diameter less than the internal diameter of bearing 33, protrude beyond the neck portion 335 of bearing 33 (see FIG. 3).

Compression spring 34 of hinge mechanism 3 (FIG. 2A) is disposed over outer wall 331 of bearing 33 and presses against lip 337. Spring 34 extends transversely of base 2 and indirectly generates a friction force by providing a horizontally directed compression force to push bearing 33 against rod 32. This interface friction force between the rod 32 and bearing 33 provides the holding force for the display unit 1 and is described in more detail below.

Mounting bracket 35 of hinge mechanism 3, as shown in FIGS. 2A, 7 and 8, includes a pair of apertures 352 and 353 formed in the outwardly extending upper wall 356. Apertures 352 and 353 each receive one of the vertical rods 26 of keyboard base 2 and are fastened thereto by screws (not shown) inserted from the underside of the apertures upwardly into the rods, thereby securing the bracket 35 to keyboard base 2. Central slot 351, dimensioned to clear the tip 325 of rod 32, in formed in the vertical wall 357 of the bracket 35. The opening 351 has circular and linear edges that correspond to the perimeter of the neck 335 of the bearing 33. Thus, when the hinged mechanism is assembled, the tip 325 and annular groove 323 of the rod 32 protrude through the central slot 351, and the neck 335 of the bearing 33 seats in the slot 351. An E-ring 42 is then seated within the annular groove 323 to secure the rod 32 to the bracket 35. A washer 40 separates the E-ring 42 from the bracket 35. Obviously, other methods of securing rod 32 to bracket 35 can be utilized.

Figure 2B:
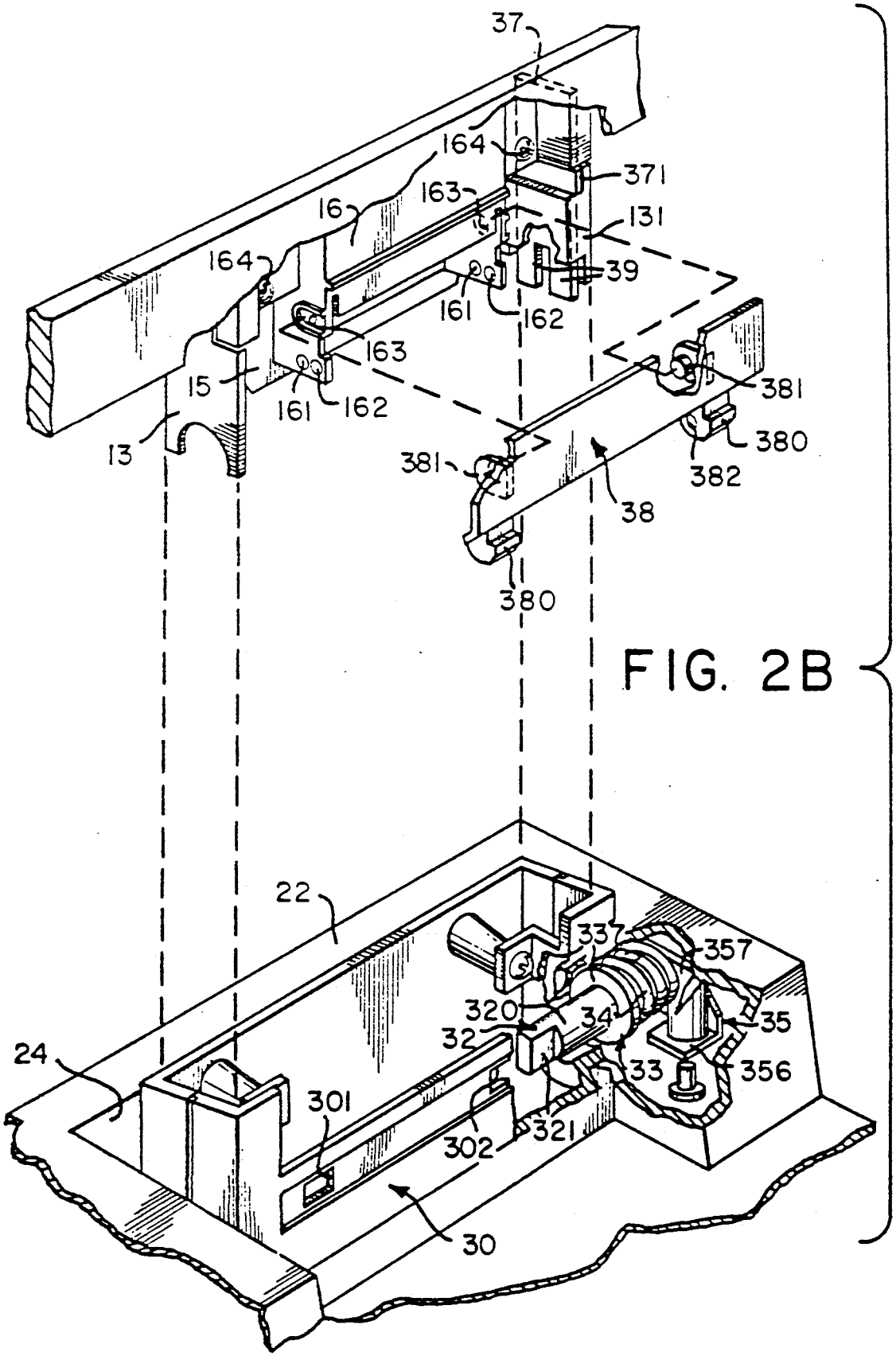
FIG. 2B is an enlarged exploded view of the hinge mechanism of the present invention.

Turning now to the attachment of display 1 to base 2, and particularly to FIGS. 2A and 2B, a mounting case 16 is secured within channel 15 to vertical member 13 by a pair of screws 164. Mounting case 16 includes a clamp receiving hole 163 formed in both the right and left side walls. First and second position fastening holes 161, 162 are also formed in each side wall, spaced below clamp receiving hole 163.

A fastening clamp 38 (FIGS. 2A and 2B) is secured within channel 15 of vertical member 13 of display 1 and fitted within hinge case 30. Two fastening pads 381, extending perpendicularly from the rear wall of clamp 38, are received within clamp receiving holes 163 to secure clamp 38 to mounting case 16. Clamp 38 further includes two downwardly extending projections 380 having curved tips which are inserted through holes 301 and 302 of hinge case 30 to connect the display unit 1 to the hinge case 30. Each projection 380 has a bump 382 for mounting clamp 38 in its open position before assembly and in its closed position after assembly. That is, holes 161 of mounting case 16 receive bumps 382 to hold clamp 38 in its open position and holes 162 receive bumps 382 to hold clamp 38 in its closed position.

A pad 37 is inserted and retained within a shaft 131 formed in vertical member 13 (FIG. 2B). Pad 37 has a pair of downwardly extending legs 39 which straddle flat portion 321 of rod 32 to provide for pivot of the display unit 1 with respect to the keyboard base 2. Stopping arm 371 of pad 37 limits downward movement; upward movement is restricted by the cover case.

As is apparent from the description above, and is repeated herein for clarity, in the assembled condition, hinge case 30 is mounted within recess 24 of keyboard base 22 so rod receiving holes 303 are in axial alignment with holes 21 and opposing lips 304 extend into respective holes 21. Flat portion 321 and central portion 320 of rod 32 extend through rod receiving hole 303 in hinge case 30. Pad 37 and clamp 38, attached to vertical member 13 of display 1, are disposed within hinge case 30 so legs 39 of pad 37 straddle flat end 321 of rod 32 and projections 380 extend through holes 301, 302 of hinge case 30. The tapered portion 322, narrow portion 324 and tip 325 of rod 32 remain outside hollow case 30 and are inserted through tubular bearing 33, so that outer wall 326 of rod 32 is frictionally engaged by tapered inner wall 333 of bearing 33. Spring 34 is disposed over outer wall 331 of bearing 33 and its forward movement is restricted by lip 337. Tip 325 extends through neck portion 335 of bearing 33 and through central slot 351 of bracket 35. Slot 351 is dimensioned to seat and to prevent rotation of the neck portion 335 relative to the bracket 35. The E-ring 42 is seated within the annular groove 323 of the rod to secure the rod 32 to the bracket 35. A washer 40 separates the E-ring 42 from the bracket 35. Annular washer 40 is seated within annular groove 323 of rod 32, and E-ring 42 is inserted over tip 325 and tightened against the outer surface 359 of vertical wall 357 to secure rod 32 to bracket 35.

As is apparent, spring 34 is sandwiched between lip 337 of bearing 33 and the inner surface of vertical wall 357 of bracket 35 to provide a push (compression) force against bearing 33. Spring 34 thereby generates a force in the axial direction of the rod, designated by arrow a in FIG. 2A, to create frictional force between the bearing 33 and the rod 32 to hold the display in its open position. Thus, the friction force generated by the spring comes into equilibrium with the force urging the display to fall down towards the keyboard base. The force required to open and close the display remains constant regardless of the position of the display because the friction force remains the same since it is independent of the angle of the display. This allows smooth opening and closing of the display.

It will be understood that the foregoing is considered as illustrative only of the principles of the invention. Therefore, within the scope of the appended claims, the invention may be practiced otherwise than as specifically described herein.

What is claimed is:

1. A hinge mechanism for a portable apparatus having a display unit and a base, comprising means disposed on the base for pivotably securing the display to the base, said display being pivotable between open and closed positions, said securing means including spring means to create a friction force between the display and the base, and a rod and a bearing receiving said rod, said spring means pressing said bearing towards said rod to create said friction force, said rod including an outer surface tapering in a first direction, said bearing including an inner wall tapering in said first direction, said tapered outer surface and said tapered wall being dimensioned to cooperate to provide friction force between said rod and bearing, said rod further including first and second ends, said first end being non-circular and adapted to connect to a connecting member of said display to provide for pivotable movement of said display relative to said base, said second end being received in said bearing, a bracket secured to said base, said bracket having a central slot receiving said second end of said rod.

2. A hinge mechanism as recited in claim 1, wherein said second end of said rod includes an annular groove, said groove extending through said central slot to receive a washer and ring to fasten said rod to said bracket.

3. A hinge mechanism as recited in claim 1, wherein said bracket comprises a pair of spaced apart apertures and said base includes a pair of downwardly extending fastening rods inserted into said apertures.

4. A hinge mechanism as recited in claim 1, wherein said spring means comprises a spring generating a compression force in an axial direction of said rod.

5. A hinge mechanism as recited in claim 4, wherein said compression force is substantially constant in said open and closed positions of the display.

6. A hinge mechanism as recited in claim 4, wherein said force is substantially constant in an intermediate position of said display between said open and closed positions.

7. A hinge mechanism as recited in claim 6, wherein in said closed position said display is substantially parallel to said base and in said open position said display is substantially about 135 degrees to said base.

8. A hinge mechanism for a portable apparatus having a display unit and a base, comprising means disposed on the base for pivotably securing the display to the base, said display being pivotable between open and closed positions, said securing means including spring means to create a friction force between the display and the base, and a rod and a bearing receiving said rod, said spring means pressing said bearing towards said rod to create said friction force, said rod including an outer surface tapering in a first direction, said bearing including an inner wall tapering in said first direction, said tapered outer surface and said tapered wall being dimensioned to cooperate to provide friction force between said rod and bearing, said rod further including first and second ends, said first end being non-circular and adapted to connect to a connecting member of said display to provide for pivotable movement of said display relative to said base, said second end being received to said bearing, a hinge case, said base including a recessed portion receiving said hinge case, said hinge case having a first opening extending along a first axis to receive said first end of said rod and having a second opening perpendicular to said first axis to receive said connecting member of said display.

9. A hinge mechanism as recited in claim 8, further comprising a clamp secured to said display, said connecting member and said clamp disposed within said hinge case, said connecting member straddling said second end of said rod to provide for rotation of said display.

10. A hinge mechanism for a portable apparatus having a base and a display pivotable relative to said base between open and closed positions, comprising:

a rod mounted on the base and having first and second portions and a longitudinal axis;

a bearing receiving said second portion of said rod to frictionally engage said rod, said second portion of said rod including a tapered surface, said bearing having a tapered inner wall cooperating with said tapered surface to provide said frictional engagement, a spring disposed over said bearing to provide a compression force against said bearing in the axial direction of the rod, thereby providing a frictional engagement between said rod and said bearing to hold said display in said open position;

a bracket mounted on said base, said rod mounted on said base by securement to said bracket; and a fastening pad secured to said display and having a pair of spaced apart legs, said first portion of said rod comprising a flat portion, said fastening pad straddling said flat portion of said rod to provide rotation of said display.

11. A hinge mechanism as recited in claim 10, wherein said second portion of said rod comprises a groove for receiving a washer and a ring disposed over said second portion for securing said rod to said bracket.

12. A hinge mechanism as recited in claim 10, wherein said bearing comprising an annular lip to restrict forward movement of said spring.

13. A hinge mechanism for a portable apparatus having a base and a display pivotable relative to said base between open and closed positions, comprising:

a rod mounted on the base and having first and second portions and a longitudinal axis;

a bearing receiving said second portion of said rod to frictionally engage said rod, said second portion of said rod including a tapered surface, said bearing having a tapered inner wall cooperating with said tapered surface to provide said frictional engagement, a spring disposed over said bearing to provide a compression force against said bearing in the axial direction of the rod, thereby providing a frictional engagement between said rod and said bearing to hold said display in said open position;

a bracket mounted on said base, said rod mounted on said base by securement to said bracket; and said bracket comprises a horizontally extending wall having a pair of holes to receive screws for mounting to the base.

14. A hinge mechanism as recited in claim 13, wherein said bracket comprises a vertically extending wall having a central slot to receive a region of said second portion of said rod.

* * * * *